G. C. TAFT.
Manufacturing the Heads and Shanks of Screw Wrenches.

No. 24,247. Patented May 31, 1859.

WITNESSES:
James H. Bancroft
Daniel A. Hawkins Jr.

INVENTOR
Geo. C. Taft

UNITED STATES PATENT OFFICE.

GEORGE C. TAFT, OF WORCESTER, MASSACHUSETTS.

MANUFACTURE OF WRENCHES.

Specification of Letters Patent No. 24,247, dated May 31, 1859.

*To all whom it may concern:*

Be it known that I, GEORGE C. TAFT, of Worcester, in the Commonwealth of Massachusetts, have invented a new and useful Improvement in the Mode of Manufacturing the Heads and Shanks or Bars of Screw-Wrenches; and I do hereby declare that the following is a full and exact description of the same, reference being had to the accompanying drawings and to the letters of reference marked thereon, so as to enable others skilled in the art to make and use my invention.

Figure 7:
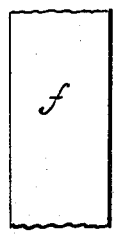
Figure 8:
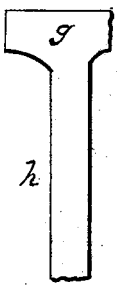
Figure 9:
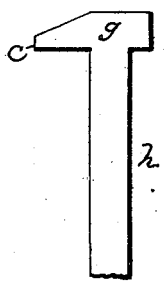

To explain the nature of my improvement I will first describe the mode heretofore in use, of manufacturing the article above referred to, and which old mode is represented in its various stages in Figs. 7, 8 and 9, of the accompanying drawings.

The mode heretofore used consisted in rolling a piece of iron into a bar (of which $f$, Fig. 7, represents a short piece) of a uniform width corresponding to the full length of the head $g$, of the screw wrench to be made. This bar was then submitted to the action of a trip hammer, so as to hammer and stretch that portion of the bar which is intended to form the shank $h$, while the upper portion of the bar which is intended to form the head $g$, is left untouched. The piece is thus brought into shape Fig. 8. The front part of the head is then hammered so as to take the shape represented in Fig. 9, when the piece is ready to be hardened or tempered.

Figure 1:
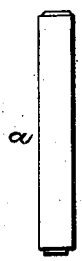
Figure 2:
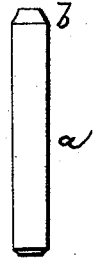
Figure 3:
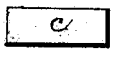
Figure 4:
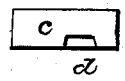
Figure 5:
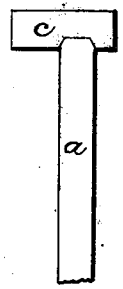
Figure 6:
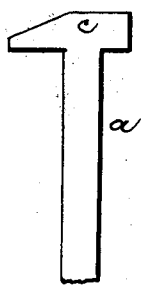

My improved process consists in rolling two bars, one of the thickness of the shank to be made, and the other of the thickness of the head to be made. Of these bars pieces are cut off, corresponding in length to the lengths of the shank and head to be made, represented at $a$, and $c$, Figs. 1 and 3. The piece $a$, is then slightly pointed as seen at $b$, and a hole $d$, corresponding to the pointed end $b$, of the bar $a$, is punched into piece $c$, as shown at $d$, Fig. 4. The pointed end $b$, is then inserted in the hole $d$, and is driven in tight; the shank and head thus put together as represented in Fig. 5, (which is a longitudinal section both of the head $c$, and shank $a$,) are then heated to a welding heat and permanently welded together and the head brought into proper shape, as represented in Fig. 6. The article is then ready to be hardened or tempered.

The advantage of my improved process will be understood from the following statements.

In working on the old plan above referred to, it takes one man a day to draw 200 bars in the shape of Fig. 8; then it takes two men another day to form the heads upon the bars as seen in Fig. 9, taking one days work of three men or three days work of one man to finish 200 bars into the shape of head and shank as represented in Fig. 9. The whole operation requires 300 pounds of coal as fuel.

In my improved process the tedious triphammer operation is altogether dispensed with, substituting therefor the far shorter operation of pointing the bar, punching the head and welding both together. By working on my improved plan it takes two men one day to finish 200 bars, and during the whole operation only 100 pounds of coal are consumed in the shape of fuel. Thus I am enabled to manufacture wrench bars and heads at one half the cost of the old mode of making them. Besides, the quality of my wrench bars has been found to be superior to that of the article heretofore manufactured.

In the sectional Figs. 3, 4, 5, 6, 7, 8, and 9, the direction of the fibers of the iron is indicated by fine lines.

It will be seen that in my wrench bar and head the fibers run with the length of the bar and head, whereas in the head of the old article (as represented in Fig. 9) the fibers run across its length. This is a great disadvantage and objection to the article when constructed as represented in Fig. 9, since in the process of hardening or tempering, the head is liable to check, owing to the grain of the fiber running across the head, and so much so that often times the end $c'$, of the head flies off in the process of manufacture. If however it does not check so much as to render the article unfit to be used, still it is found that in many cases that as soon as the wrench is subjected to a little rough use, that it breaks and becomes worthless. Again a more beautiful polish can be given to my wrench since the fibers are polished lengthwise and not crosswise.

Having described my improved mode of manufacturing the head and shank or bar of screw wrenches, and having stated the important advantages resulting from the application of my improvement, what I claim and desire to secure by Letters Patent, is:—

The above described peculiar mode of constructing the head and shank of screw wrenches, viz:—by first forming or constructing the head c, and shank or bar a, separately, as shown and described, and then uniting the head and shank, after the shank a, has been inserted into the depression d, first made in the head c, by welding, the whole operation being substantially as above described and for the purposes set forth.

GEO. C. TAFT.

Witnesses:
JAMES H. BANCROFT,
D. A. HAWKINS, JR.